H. AUFDEMBRINKE.
Pitmans.
No. 136,690. Patented March 11, 1873.
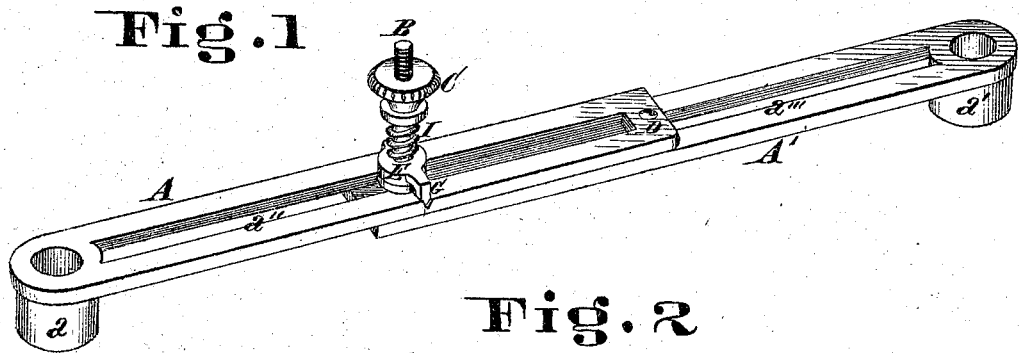
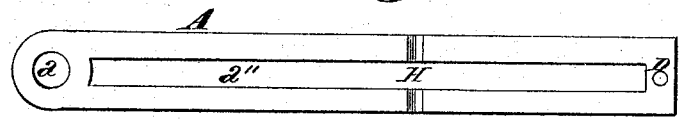
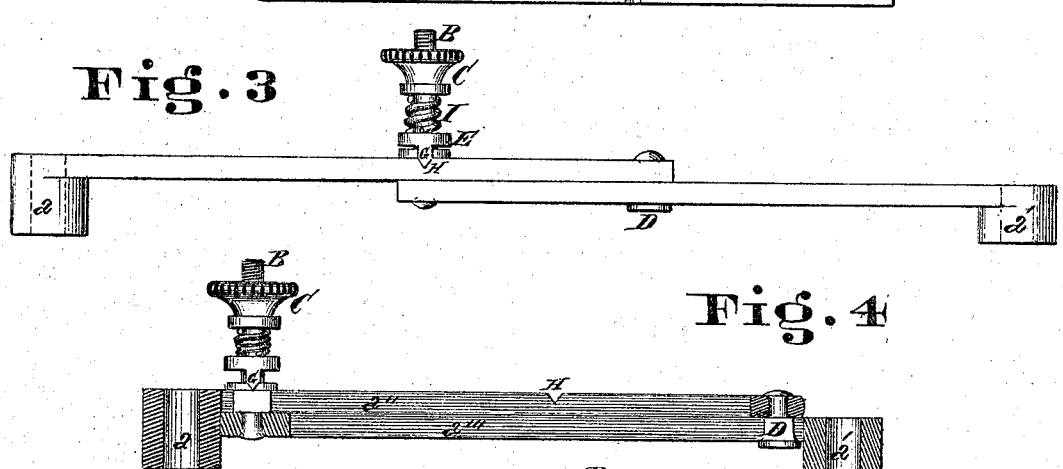
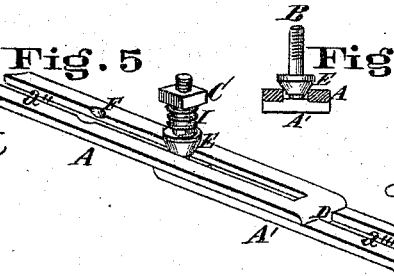
Attest
Inventor
Henry Aufdembrinke
By F. Millward
Attorney

UNITED STATES PATENT OFFICE.

HENRY AUFDEMBRINKE, OF CINCINNATI, OHIO.

IMPROVEMENT IN PITMEN.

Specification forming part of Letters Patent No. 136,690, dated March 11, 1873.

*To all whom it may concern:*

Be it known that I, HENRY AUFDEMBRINKE, of Cincinnati, Hamilton county, State of Ohio, have invented a certain new and useful Construction of Pitman, of which the following is a specification:

Nature and Objects of Invention.

My invention relates to the construction of pitmen for operating the shuttle of sewing-machines and for other uses; and consists of such a construction of the pitman as will, when any part of the mechanism it drives is suddenly checked by the displacement of a shuttle or other accidental obstruction, enable it to lengthen and shorten in such a way as to permit the machine to continue its motion without any corresponding movement of the mechanism the pitman drives—the purpose of the invention being to avoid breakages which frequently occur under such circumstances with the customary unyielding pitman.

Description of the Accompanying Drawing.

Figure 1 is a perspective view of a pitman of my improved construction. Fig. 2 is a plan of one of the component parts. Fig. 3 is a side view of the pitman complete, and Fig. 4 is a longitudinal section partly in elevation of the same. Figs 5 and 6 represent perspective views of a modification in the construction of the pitman.

General Description.

A A' are the two parts composing the frame of the pitman. They are united together by bolt B and thumb-screw or nut C. The parts A A' are constructed with sockets or journal-bearings $a$ $a'$ for connection with the treadle and crank-wrist of the machine, and are both slotted at $a''$ $a'''$, the slot $a''$ receiving the tightening and connecting bolt B, and the slot $a'''$ the stud D. The bolt B has a washer, E, fitted to it which is conically formed on the lower side to fit a conical recess, F, (see Fig. 5,) in the part A, or fitted with V-shaped projections G to rest in V-shaped notches H in the part A. (See Fig. 1, 2, or 3.) Between the adjustable nut C and loose washer E a spiral spring, I, is interposed, which is adapted to press the washer into the recess or recesses F or H with a sufficient force to prevent any displacement of the washer and consequent slipping of the parts A A' over each other during the time the machine to which it is connected is acting properly. The degree of pressure exerted by the spring I may be regulated by the adjustment of the nut C, so that the force employed to hold the parts A A' in the proper position with relation to each other for the performance of the work to be done may be made so nearly equal to the ascertained resistance offered in the operation of the machine that whenever resistance or obstruction not provided for—such as the accidental displacement of shuttle or other operative parts—occurs, the parts A A' are caused to slip over each other so as to expand or contract the length of pitman, and thus save any weak parts of the machine from fracture or damage by the yielding of the pitman. The object is simply to locate the weakest structure in the connection between the two parts of the pitman, so that upon any accident occurring during the performance of the machine the pitman shall be the first to give way.

It is obvious that many modifications may be made in the form of the parts A A' and the construction of the device to connect the two parts together without departing from the distinguishing characteristics of my invention; as, for example, the parts A A' may be of tubular form, fitting one within the other, and connected by a suitable yielding stop similar in character to that shown in Fig. 1 or 5.

I do not propose to claim, broadly, a pitman or rod composed of two sections, held rigidly together by a spring-clamp, but capable of sliding upon each other under abnormal resistance to endwise movements, as I am aware that this principle has been embodied in needle-bars of sewing-machines, permitting them to shorten when the needle in its downward motion meets with undue resistance. But such a bar is not capable of lengthening beyond the proper given length, nor is there any necessity for it in such connection. The distinguishing characteristic of my invention consists in such a construction of a pitman or connecting rod that it may, from a given length, lengthen as well as shorten, and thus form a safeguard against damage to the parts it drives, whether they meet with undue resistance during the forward or the return stroke of the pitman.

*Claim.*

A pitman, composed of two sections, A A', secured together by a spring-clamp, and constructed, substantially as specified, so as to permit it either to shorten or lengthen in consequence of undue resistance to its endwise movement in one direction or the other.

In testimony of which invention I hereunto set my hand.

HENRY AUFDEMBRINKE.

Witnesses:
FRANK MILLWARD,
HENRY MILLWARD.